UNITED STATES PATENT OFFICE.

BERNARD C. GILLIGAN, OF TOLEDO, OHIO, ASSIGNOR, BY DIRECT AND MESNE ASSIGNMENTS, OF ONE-THIRD TO WILLIAM B. DUCK AND TWO-THIRDS TO MARGARET J. GILLIGAN, BOTH OF TOLEDO, OHIO.

COMPOSITION OF MATTER FOR MOLDS AND FORMS FOR GLASSWARE.

1,165,003.  Specification of Letters Patent.  Patented Dec. 21, 1915.

No Drawing. Continuation of application Serial No. 548,471, filed March 10, 1910. This application filed May 1, 1914. Serial No. 835,738.

*To all whom it may concern:*

Be it known that I, BERNARD C. GILLIGAN, a citizen of the United States, residing at Toledo, in the county of Lucas and State of Ohio, have invented a Composition of Matter for Molds and Forms for Glassware, of which the following is a specification.

This invention relates to an improvement in molds, press forms, dies, cores, plungers and the like used in the manufacture of glassware, and more particularly relates to a composition of matter from which the molds and other devices are formed, and to a coating which is applied to the surface of the device of this composition.

This application constitutes a continuation of application Serial No. 548,471, filed March 10, 1910, for a composition of matter for press forms.

Heretofore, in the prior art of glass manufacturing, iron molds and iron plungers have been used and are used at the present time in the production of what is known as pressed ware, and only relatively thick and heavy articles of a crude and cheap nature with practically no finish could be produced, such as drinking glasses, bowls, and the like. It is impossible to manufacture neat and artistic glass articles with an iron mold and plunger, for the iron mold chills the outer surface and the plunger chills the inner surface of the pressed article and takes away the much desired natural brilliant luster of the glass. Attempts have been made to cut the desired designs on the outer surface of the article thus produced and, although when cut the natural brilliant luster of the glass is restored to the outer surface of the article, the lustrous surface does not show up to advantage on account of the inner chilled and dimmed surface. For a great many years the only way to produce cut glass designs was by expert cutters who would cut out the entire pattern from glass which was blown on the end of a blow pipe, a method very tedious and expensive, and wherein the designs and shapes of the articles were limited to a great extent. By blowing the glass the natural brilliant luster thereof was preserved. Many attempts were made to reduce the cost of producing cut glass designs which were, at least practically unsuccessful until the invention of one Michael J. Owens, set forth in Patent No. 628,027, dated July 4, 1899, which relates to a process of reheating the inner surface of pressed or molded articles to bring back the natural brilliancy of the glass. This new process of reheating the inner surface of the article while still in the mold is objectionable in that it does not remedy the disadvantage met with in treating the outer surface of the pressed or molded article, as it melts the glass and does not in all cases produce a perfectly even finish, and also in that it involves a separate and additional process or number of steps, melts relatively thin molded or pressed articles, and involves a consequent additional cost in the manufacture of the article. Again, in the field of blown glassware iron molds are used which are provided upon their inner surfaces with a coating of plumbago and fine cork-dust, or fine sawdust, or a mixture of the same, which lining is subjected to considerable heat to cause the lining to adhere to the iron mold. This leaves the inner surface of the mold quite rough and it is necessary for the glass blower to first blow a quantity of glass in the mold to burn and smooth the interior thereof, the glass thus used being taken from the mold and discarded. It is also necessary for the glass blower to inject a small quantity of water in the mold to preserve the paste from burning up on account of the heat of the glass. As the mold is made of iron it is necessary that the glass being blown be constantly revolved in the mold to prevent seams in the article and also chilling of the article, the conversion of the water to steam within the mold helping to a great extent but not perfectly to retain the natural luster of the glass upon the surface of the article. It is thus seen that in the production of blown glassware in molds, as above described, that the field is limited in the shapes and designs imparted to the articles, for the reason that the glass being blown must be revolved in the mold to prevent seams therein and chilling and also to help retain the original luster of the glass. If designs are desired the article thus blown in the molds must, of necessity, be made thick and heavy so as to withstand the operation of cutters applied to the article for producing the various designs. It is thus practically impossible to produce a relatively thin article ornamented by elaborate or heavy designs.

The present invention has for its main object to provide a mold or similar device composed of a composition, and a brush-coating for the mold of this composition, wherein the original brilliant luster of the glassware is retained in molding on the outer surface of the article, and in pressing on the inner surface of the article so that the article may be removed from the mold practically finished and without the tedious and expensive additional process of reheating or polishing, and may be then cut to produce the desired designs or configurations.

The composition of this invention is such that it is not necessary to turn the article in the mold for the glassware will not be chilled and its original brilliant luster will be retained without such operation. It is thus seen that by the use of this invention relatively thin glass articles may be produced in the molds or press forms, that fanciful and elaborate designs may be impressed in the surfaces of the articles by the molding devices, and at the same time the original brilliant luster of the glass is maintained.

In carrying out the objects of this invention, the molds, press forms, dies, plungers and the like devices are made of a composition having certain hereinafter pointed out characteristics, the present disclosure being a composition of amorphous carbon, calcined lamp black and a suitable binder having a non-gaseous and non-incrustive character. There is also added to the mold when formed a brush-coating of graphite for a purpose which will hereinafter appear. The amorphous carbon is used to provide a body material having a heat non-conducting quality sufficient to resist the heat of the glass and to prevent chilling of the glass in the mold. The calcined lamp black is employed for filling in the pores of the amorphous carbon body and providing a smooth polished surface to the mold. The binder is utilized in retaining the carbon and the calcined lamp black in a homogeneous mass. The brush coating of graphite is applied to the finished product for the purpose of preventing the burning out of the calcined lamp black and the carbon, and for providing a very smooth surface to the plunger mold or other device and to retain in the articles molded the original brilliant luster.

The anhydrous binder may be anhydrous sugar or anhydrous tar. If anhydrous sugar is used for the binder, the sugar is placed in a boiler and subjected to a moderate fire, preferably made of small broken coke, the quantity of sugar in the boiler, when heated to about 400° F. loses two equivalents of water, assumes a brownish color, and is then known as caramel. This caramel cannot be recrystallized. If anhydrous tar is used for the binder the tar is distilled to near the coking point and is then pulverized. The tar is then added to the other ingredient, the mass being slightly heat treated to render the tar plastic. Both the tar and the caramel may be used to bind the particles of the coke. In such combination the tar provides the main body of the binder when the ingredients are subsequently baked, the caramel because of its adhesive or semi-fluid or syrupy condition serving to hold the pulverized anhydrous tar and the pulverized coke in a plastic mass when properly admixed and press molded. This result is obtained without heating the tar and coke by the use of the caramel as a part initial binder. The coke is mixed with calcined lamp black, the coke being pulverized to a less degree of fineness than the lamp black, and being sharp by nature, breaks up into particles of various irregular forms providing pores throughout the entire pulverized mass of coke, which are filled more or less by the lamp black. The number of unfilled pores in the coke are determined by the quantity of lamp black admixed with the coke. The ingredients are submitted to repeated pugging to thoroughly stir and mix the same thereby insuring a uniform mass. After being thoroughly mixed, the combined mass is partly dried by subjecting it to an even, moderate heat derived preferably from the sole combustion of suitable material and then pressed into blocks of the desired size and form. When a number of like blocks are required, a block mold is provided with either intaglio or relief decorations, which decorations are formed in reverse order upon or within the glass mold block. The inner walls of the mold are preferably lubricated to facilitate the separation of the sections of the mold from about the block. When tar alone is used as the binder, it is necessary to apply a moderate heat to the press-mold, preferably by steam, to facilitate the removal of the mold from the block. In determining the amount of the material placed in the press form or mold with which to form the blocks having the impressed decorations, allowance must be made for shrinkage both during the drying or seasoning and the baking of the blocks.

After the mass is press-molded into blocks suitable for press forms or dies for glassware, they are thoroughly dried or seasoned. This drying or seasoning is effected in a drying room having sub-divisions consecutively increasing in temperature from about 75° to 140° F. through which the blocks are passed to thoroughly and evenly dry out the same. When these blocks are formed with impress mold cavities, suitable containers are used to preserve their shape during the drying process. This seasoning of the blocks evaporates the remaining water including the water added as a diluent for the caramel, and places the blocks in condition for baking. The admixing of either or both of these binders, the same being pretreated as above set forth, prior to its introduction into the coke, fills in the pores of the coke and drives off a large percentage of the hydrogen gases absorbed by the coke producing a substantially perfect homogeneity throughout the combined mass. The blocks are now baked in a muffle or other suitable container, in which the remaining hydrogen gases are driven off both from the amorphous coke and the binder, this liberation of the gases being more or less negligible as the pretreatment of the binders, the near coking of the anhydrous tar, and the anhydrous sugar, drives off substantially all of the remaining hydrogen gases held by them. After the baking of these composition blocks they are suitably finished for press forms and dies used in the manufacture of glassware. The remaining pores in the coke not filled with lamp black permit the blocks being faced with graphite, plumbago, or other suitable material similar to the composition of the blocks when placed in the molds, the facing material being retained by clenching in the pores of the blocks. The facing material is applied to provide a protective coating of considerable thickness for the blocks, preserving the composition blocks from destruction when used with glass in press forms, or dies, wherein the glass is in its hottest state. The finished forms and dies for glassware and thus composed of layers and they are in the form of a layered structure in which the body comprises coke and the lining is composed of foliated or natural carbon suitably applied and is renewable. Said natural carbon serves as a constant lubricant by means of which the movement of glass, if desired, is facilitated along the form or die faces. However, for some kinds of molds or forms said lining may be omitted and the pores of the composition initially filled by lamp black, in which instance the relative amount of lamp black is suitably varied.

The proportions of the ingredient coke may vary from 50 to 85 parts, the binder being a nearly constant quantity but is varied relative to the extent of calcined lamp black employed to more or less fill the pores of the pulverized coke.

Press forms and dies for glassware made of my composition of matter are neutral relative to the absorbing of heat from hot glass which is, in consequence, not chilled. The nature of the glass is not affected when press molded in forms or dies of my composition, also creep marks are avoided.

In press-ornamenting blown off-hand glassware the graphite may be omitted, likewise such graphite lining may be omitted to press ornament glassware blown in paste molds or in molds made of my composition.

It is of course to be understood that this invention is not limited to the specific composition herein set forth, or to the specific proportions of the ingredients set forth, as any other composition or proportion may be employed within the scope of this invention which possesses the characteristics necessary to satisfy, and which accomplishes the desired results according to this invention.

What is claimed is—

1. A molding material for press forms or dies for glassware comprising coke in a pulverized state, a quantity of calcined lamp-black admixed with the coke, and an anhydrous binder admixed with the coke and lamp-black.

2. A molding material for press-forms and dies for glassware comprising a quantity of coke, calcined lamp-black admixed with the coke in a quantity sufficient to fill the pores of the coke, and a binder of anhydrous tar and caramel admixed with the coke and lamp-black.

3. A composition of matter for molds, forms and dies used in the manufacture of glassware, comprising coke, calcined lamp-black admixed with the coke to fill in the pores thereof, and a binder admixed to the coke and lamp-black for uniting the same in a homogeneous mass said binder being free of volatile ingredients.

4. A composition of matter for molds, forms and dies for glassware, comprising coke, lamp-black admixed with the coke, and a carbonaceous binder uniting the coke and the lamp-black.

In testimony whereof I have hereunto set my hand in presence of two subscribing witnesses.

BERNARD C. GILLIGAN.

Witnesses:
Wm. B. Duck,
Luvina A. Duck.